3,331,683
METHOD OF STABILIZING PLUTONIUM DIOXIDE
William C. Pritchard, Los Alamos, N. Mex., assignor to the United States of America as represented by the United States Atomic Energy Commission
No Drawing. Filed May 2, 1966, Ser. No. 547,033
4 Claims. (Cl. 75—206)

ABSTRACT OF THE DISCLOSURE

An improved process for stabilizing powdered plutonium dioxide by adding a stabilizing agent selected from the class of tungsten and molybdenum powders, the molybdenum being added in an amount of about 2 weight percent and the tungsten being added in an amount of about 2 volume percent, mixing, compacting and sintering.

---

The invention described herein was made in the course of, or under, Contract W–7405–ENG–36 with the U.S. Atomic Energy Commission.

This invention deals with an improved process of producing stabilized plutonium dioxide by the addition of molybdenum or tungsten to the plutonium dioxide prior to the sintering operation. Heretofore, plutonium dioxide had been stabilized by the use of carbon dioxide gas during the sintering operation. However, this method requires special precautions well known in the art which are obviated by the method herein disclosed.

The prime purpose of stabilizing plutonium dioxide, by which we mean keeping the plutonium dioxide in a single phase and preventing specifically the formation of alpha $Pu_2O_3$, is quite important as regards using the fuel in a reactor. The importance lies in the fact that these oxides of plutonium have densities that vary by a considerable amount which in turn affects the amount of radiation which a given unit of fuel will produce. In particular, plutonium dioxide which is of the face centered cubic form has a density of 11.46 grams per cubic centimeter while the corresponding alpha $Pu_2O_3$ has a density of only 10.20 grams per cubic centimeter. Hence, the dioxide of plutonium is 10% more dense than the alpha form of $Pu_2O_3$. In air, alpha $Pu_2O_3$ oxidizes to plutonium dioxide and therefore from a design problem it is important that the plutonium dioxide be stabilized in that form so as to present a single phase and a corresponding single density.

The inventor has discovered a process by which freshly prepared plutonium dioxide with the addition of either molybdenum or tungsten metal in the powdered form is mixed and then heated in a dry argon atmosphere to a temperature of 1650° C. for a period of about 6 hours. The amount of molybdenum metal necessary to stabilize the plutonium dioxide has been found to be about 2 volume percent. The addition of tungsten is varied between 2 weight percent and ½ weight percent dependent on sintering temperature and time. An essential part of this process and one of its desirable features is that a standard furnace can be used to perform the sintering operation for heating the plutonium dioxide to a dense pellet. As stated above, the sintering operation was previously carried out in an oxidizing atmosphere ($CO_2$) while the inventor's process is limited to a non-oxiding atmosphere.

It is therefore an object of this invention to provide a process for the production of single phase, stabilized plutonium dioxide by the addition of a small amount of powdered molybdenum or tungsten metal.

Another object of this invention is to provide a process for the production of plutonium dioxide in which a standard sintering furnace is used to increase the density of plutonium dioxide.

Other objects of this invention will be apparent from the preferred embodiment which is described as follows:

A freshly prepared plutonium dioxide powder having a lattice spacing of 5.395 A. is mixed with approximately 2 volume percent powdered molybdenum. After compacting this powdered mixture, it is heated to 1650° C. for about 6 hours in a standard furnace using a dry argon atmosphere. The resulting plutonium dioxide has a theoretical density of greater than 95% and is effectively stabilized in the form of plutonium dioxide.

A second embodiment of this invention is the addition of tungsten powder to freshly prepared plutonium dioxide in which 2 weight percent tungsten is mixed with the powdered plutonium dioxide. The compacting step is by any well known method while the sintering operation is carried out under the same conditions as the preferred embodiment using molybdenum.

The inventor has discovered that about 2 volume percent molybdenum is necessary to totally prevent the formation of alpha $Pu_2O_3$; however, at lower sintering temperature (1600° C) and limiting the sintering time (3 hours), the formation of alpha $Pu_2O_3$ is significantly inhibited, i.e., to less than 0.5 volume percent being present in the plutonium dioxide pellet.

The inventor has varied the parameters of this process as regards tungsten and has found that as little as ½ weight percent tungsten will stabilize the plutonium dioxide provided that the sintering temperature is restricted to a temperature of 1600° C. and the sintering period to 3 hours. Of course, by reducing the sintering temperature and period a less dense plutonium dioxide is obtained; however, for many reactor designs it is possible that a less dense fuel may be satisfactory. Likewise, the inventor has found there is no advantage to adding more than 2 weight percent tungsten to the plutonium dioxide since greater additions, although stabilizing the plutonium dioxide, will affect adversely the density of the final product and thus defeat the purpose of this invention.

Although the invention in its preferred embodiment is concerned with molybdenum as the stabilizing ingredient, tungsten may be substituted. In addition, the inventor has found that as little as ½ weight percent tungsten will stabilize the plutonium dioxide provided that less stringent sintering conditions are used, particularly reducing the sintering temperature to about 1600° C. and the period at said temperature to 3 hours. The use of tungsten as a stabilizing material has only one disadvantage over the molybdenum, and that is in all cases the tungsten produces a less dense plutonium dioxide than could be obtained under corresponding molybdenum addition.

Table I is presented to show the various results obtained.

TABLE I

| Amount of Metal Added | Sintering Schedule | Stabilization Effect | Density of Sintered Material, Percent |
|---|---|---|---|
| 5 v/o Mo | 6 hrs. at 1,650° C. in dry argon. | Stabilized | 95.2 |
| 2 v/o Mo | ----do---- | ----do---- | 96.1 |
| 1 v/o Mo | ----do---- | Inhibited Formation of alpha $Pu_2O_3$. | 96.2 |
| 0.5 v/o Mo | 6 hrs. at 1,600° C. in dry argon. | ----do---- | 97.0 |
| 2 w/o W | 6 hrs. at 1,650° C. in dry argon. | Stabilized | 92.7 |
| 0.5 w/o W | ----do---- | Inhibited Formation of alpha $Pu_2O_3$. | 93.2 |
| 2 w/o W | 3 hrs. at 1,600° C. in dry argon. | Stabilized | 92.5 |
| 0.5 w/o W | ----do---- | ----do---- | 94.0 |

In particular, although the foregoing specification only describes a method in which a dry argon atmosphere is used during the sintering operation, it is within the scope of this invention that any inert gas or non-oxidizing atmosphere may be substituted. Thus, the foregoing illustrations of the present invention are not intended to limit its scope which is to be limited entirely by the appended claims.

What is claimed is:

1. A method of stabilizing freshly prepared plutonium dioxide so as to prevent the formation of alpha $Pu_2O_3$, said stabilizing step comprising the addition of a stabilizing element selected from the class consisting of molybdenum and tungsten in the powdered form, said molybdenum being added in an amount of about 2 volume percent, and said tungsten being added in an amount of about 2 weight percent, mixing one of the stabilizing elements with powdered plutonium dioxide, prior to the compacting and sintering operation.

2. The method of claim 1 in which molybdenum powder in an amount of about 2 volume percent is added to the plutonium dioxide and said mixture is compacted and then sintered at a temperature of about 1650° C. for about 6 hours.

3. The method of claim 1 in which tungsten powder in an amount of about 2 weight percent is added to the plutonium dioxide and said mixture is compacted and sintered at a temperature of about 1650° C. for about 6 hours.

4. The method of claim 1 in which about ½ weight percent tungsten powder is added to the plutonium dioxide, and said mixture is sintered at a temperature of about 1600° C. for about 3 hours.

References Cited

UNITED STATES PATENTS 3,276,867  10/1966  Brite et al. _____ 75—206

FOREIGN PATENTS 723,583  12/1965  Canada.
948,948  2/1964  Great Britain.

OTHER REFERENCES

AEC Document, LA-3316 MS, May 28, 1965, p. 27.

L. DEWAYNE RUTLEDGE, *Primary Examiner.*

R. L. GRUDZIECKI, *Assistant Examiner.*